No. 821,100. PATENTED MAY 22, 1906.
J. H. HOYER.
PISTON ROD PACKING.
APPLICATION FILED DEC. 22, 1905.

UNITED STATES PATENT OFFICE.

JOHN H. HOYER, OF CORLISS, WISCONSIN.

PISTON-ROD PACKING.

No. 821,100.　　　　Specification of Letters Patent.　　　　Patented May 22, 1906.

Application filed December 22, 1905. Serial No. 292,905.

*To all whom it may concern:*

Be it known that I, JOHN H. HOYER, a citizen of the United States, and a resident of Corliss, in the county of Racine and State of Wisconsin, have invented certain new and useful Improvements in Piston-Rod Packing; and I do hereby declare that the following is a full, clear, and exact description thereof.

The invention consists in certain peculiarities of construction and combination of parts hereinafter particularly set forth with reference to the accompanying drawings and subsequently claimed, its object being to provide simple, economical, steam-tight packing for piston-rods.

Figure 1:
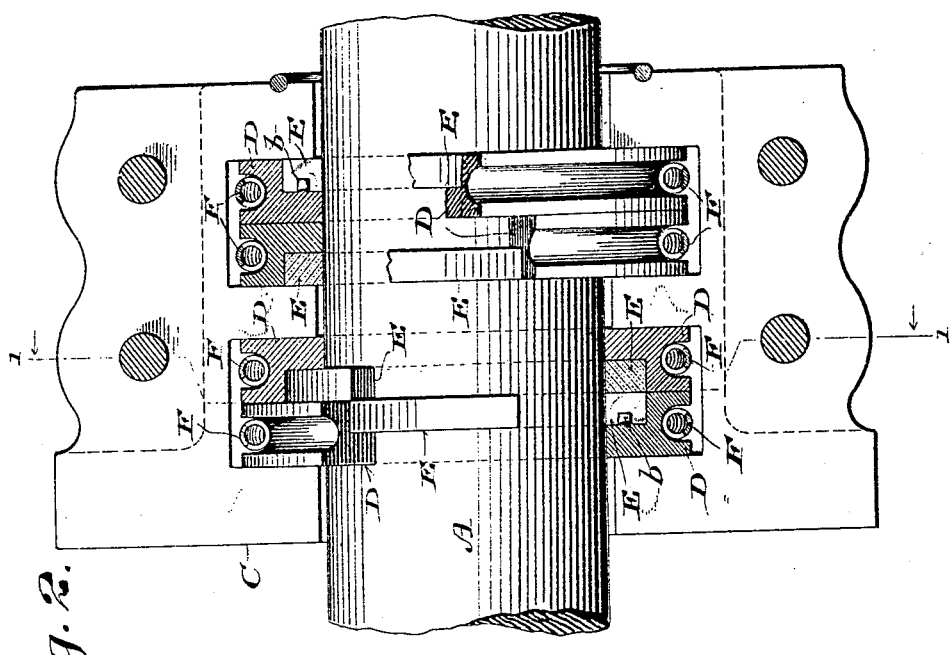
Figure 2:
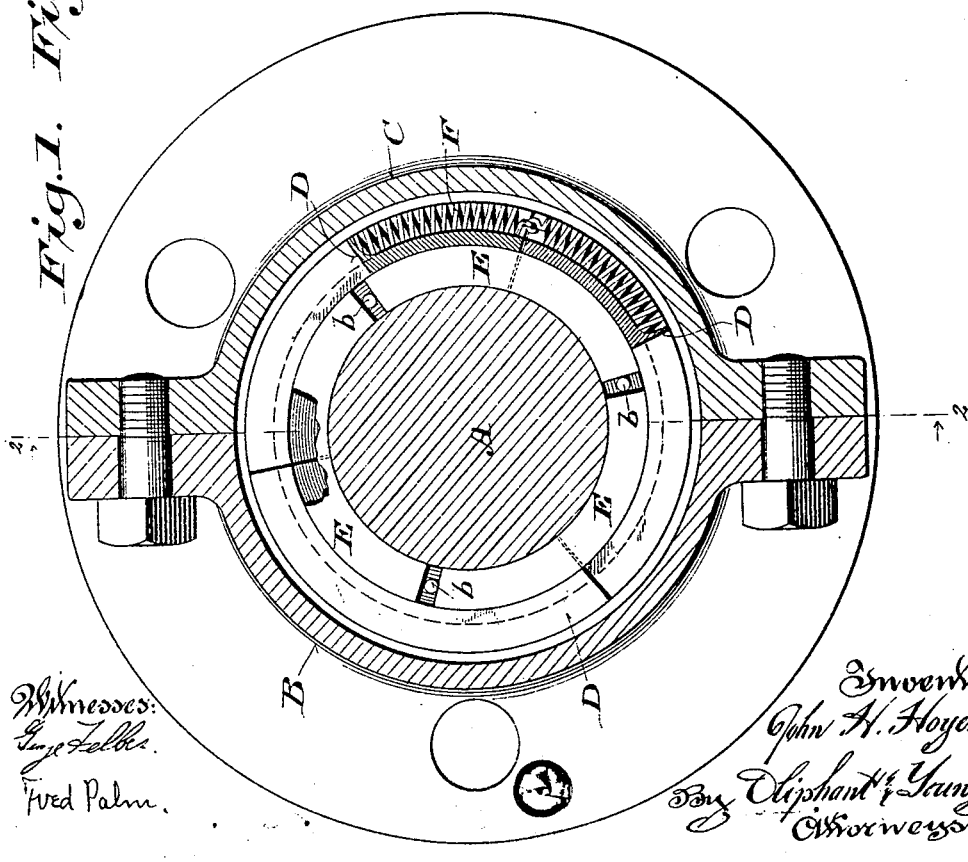

Figure 1 of the drawings represents a partly-sectional view, indicated by line 1 1 in Fig. 2, and it illustrates the application of a packing in accordance with my invention; and Fig. 2, a similar view indicated by line 1 1 of Fig. 1.

Referring by letter to the drawings, A indicates a piston-rod, and B C the sections of a separable bonnet attachable to the head of a steam-cylinder and which contains my improved packing for the piston-rod. The packing is preferably multiple in the bonnet, two packings to a set, as herein shown, the sections of said bonnet being recessed to form annular chambers containing the packings.

Each packing comprises an outer ring divided into segments D, between the meeting ends of which space is provided to compensate for the wear of said segments and the piston-rod. The segments of the outer packing-ring are each provided with a right-angle side recess for the engagement of a segment E of an inner packing-ring, and the several segments of said outer packing-ring are peripherally grooved for the engagement of an annular spiral spring F under tension, the ends of the spring being hooked together. The segments E of the inner packing-ring are arranged to break joints with the segments D of the outer packing-ring, and in the assembly of both rings one with the other the proper positions of the segments of said inner ring are determined by stop-pins *b*, projecting from the segments of said outer ring or each pin may be a dowel of one segment engaging a corresponding recess of another segment.

The segments E of the inner packing-ring have ground-joint fit of side and periphery in the segments D of the outer packing-ring to insure of their steam-tight engagement, and by having one packing-ring within another the two rings occupy but one-half the space of a like number of packing-rings of the ordinary construction, while one spring serves to tension both packing-rings upon the piston-rod.

It is preferable to employ two pairs of intermatching packing-rings in one space in the bonnet aforesaid, and they may be so arranged that the several segments of one pair of the rings oppose those of the other pair, preferably in ground-joint contact, or the arrangement may be such that only the segments of the outer rings are opposed in preferably ground-joint contact, both arrangements being shown in Fig. 2.

It is also evident that the segments of the several outer packing-rings may be arranged to have the recesses of all their segments and the inner packing-ring segments therewith face sidewise in the same direction, or the arrangement may be such that the recessed sides of a pair of the outer packing-rings and the segments of the inner packing-rings therewith face sidewise in the same direction opposite that of the recessed sides of the segments of the other pair of outer packing-rings and those of the inner packing-rings therewith.

From the foregoing it will be understood that I provide a reversible metallic packing suitable for both non-condensing and condensing steam-engines, this important feature of my invention being due to the right-angular recessing of the segments of the outer packing-rings on one side only. For non-condensing engines it will be preferable to arrange the packing so that the recessed sides of the segments of the outer rings of same and the segments of the inner packing-rings therewith all face outward sidewise thereof. For a condensing-engine it will be preferable in practice to arrange the packing so that the recesses of the segments of one pair of the outer packing-rings and the segments of the inner packing-rings therewith face outward sidewise thereof, while the recesses of the outer packing-rings of the other pair and the segments of the inner packing-rings therewith face sidewise in a direction contrary to that aforesaid.

I claim—

1. A piston-rod packing comprising an outer ring divided into segments each having one side only thereof provided with a right-angle recess, an inner ring divided into segments fitting the recesses of the outer ring-segments with which they break joints and have their sides and peripheries in ground-joint contact, and an annular spring under tension on the segments of said outer ring.

2. A piston-rod packing comprising an outer ring divided into segments each having one side only thereof provided with a right-angle recess, an inner ring divided into segments fitting the segments aforesaid with which they break joints and have their sides and peripheries in ground-joint contact, means for determining the proper position of the inner ring-segments, and an annular spring under tension on the segments of said outer ring.

3. A piston-rod packing comprising an outer ring divided into segments each having one side only thereof provided with a right-angle recess, an inner ring divided into segments fitting the segments aforesaid with which they break joints and have their sides and peripheries in ground-joint contact, stop-pins projecting from the outer ring-segments between ends of the inner ring-segments, and an annular spring under tension on the segments of said outer ring.

4. A piston-rod packing comprising duplicate outer rings each divided into segments having one side only thereof provided with a right-angle recess, duplicate inner rings divided into segments fitting the recesses of the outer rings with which they break joints and have their sides and peripheries in ground-joint contact, the opposing surfaces of the duplicate parts in the packing being in similar contact, and annular springs under tension on the segments of the aforesaid outer rings.

In testimony that I claim the foregoing I have hereunto set my hand, at Milwaukee, in the county of Milwaukee and State of Wisconsin, in the presence of two witnesses.

JOHN H. HOYER.

Witnesses:
N. E. OLIPHANT,
GEORGE FELBER.